United States Patent [19]

Hudis

[11] 4,074,802

[45] Feb. 21, 1978

[54] CONCRETE RECEIVER AND PLACER FOR ROAD PAVING

[75] Inventor: Michael I. Hudis, Milwaukee, Wis.

[73] Assignee: Rexnord Inc., Milwaukee, Wis.

[21] Appl. No.: 716,391

[22] Filed: Aug. 23, 1976

[51] Int. Cl.² .............................................. B65G 41/00
[52] U.S. Cl. ...................................... 198/315; 198/316; 198/535; 198/863; 404/91; 404/101
[58] Field of Search ............... 198/315, 316, 535, 536, 198/586, 862, 863, 569; 404/91, 101, 106, 108, 100; 212/54, 59 R, 144; 193/31 A

[56] References Cited

U.S. PATENT DOCUMENTS

| | | | |
|---|---|---|---|
| 487,559 | 12/1892 | Flemming | 198/863 X |
| 1,217,938 | 3/1917 | Guice | 193/31 A |
| 1,267,440 | 5/1918 | Mosby | 404/108 X |
| 2,598,880 | 6/1952 | Beldin | 198/863 |
| 3,144,928 | 8/1964 | Roloson | 198/536 |
| 3,966,343 | 6/1976 | Dick et al. | 404/101 |

FOREIGN PATENT DOCUMENTS 1,367,677  6/1964  France .............................. 212/59 R

*Primary Examiner*—Bruce H. Stoner, Jr.
*Assistant Examiner*—Douglas D. Watts

[57] ABSTRACT

The placer includes a frame and powered ground traction means at each side. A belt conveyor has a discharge end supported by a swinging arm carried by the frame. The conveyor frame members also translate over flanged wheels such that the conveyor has an extended position where the loading end of the conveyor is on the shoulder or relatively near the ground and the discharge end is above the placer for discharge between the placer frame members to the subgrade. In the retracted position the conveyor is disposed over the placer frame and allows the delivery trucks on the shoulder to pass the placer.

12 Claims, 11 Drawing Figures

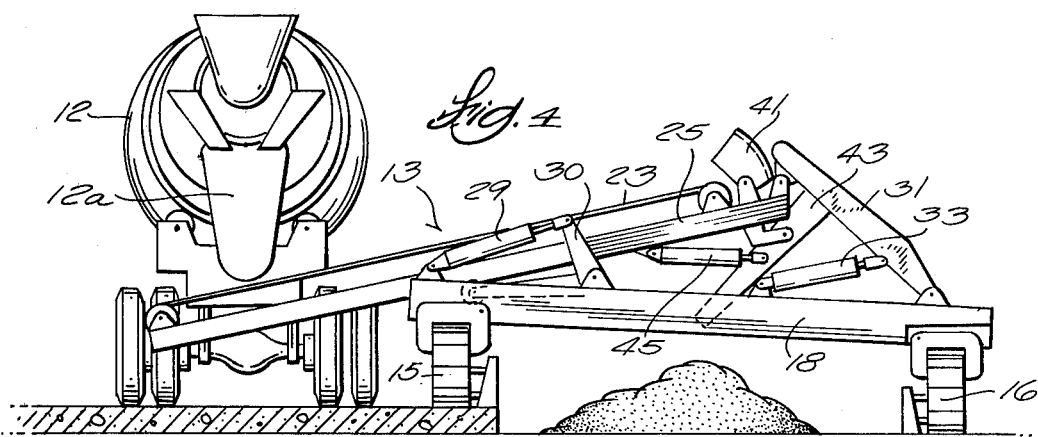
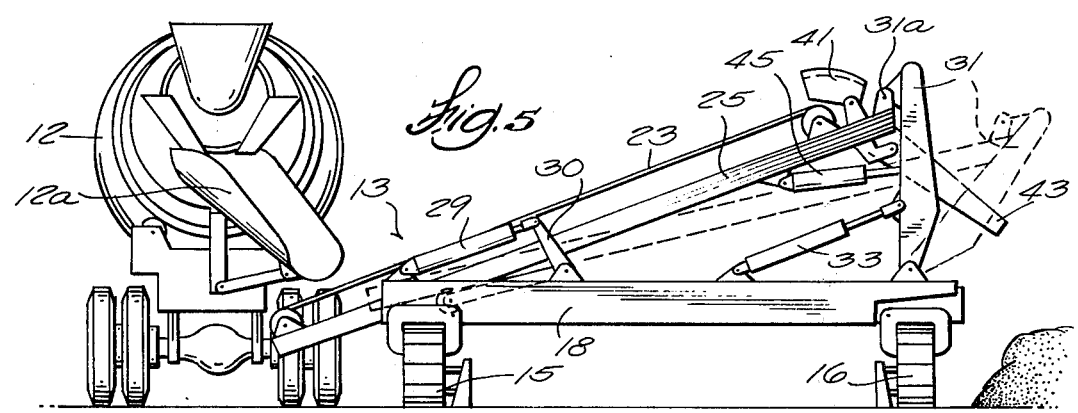
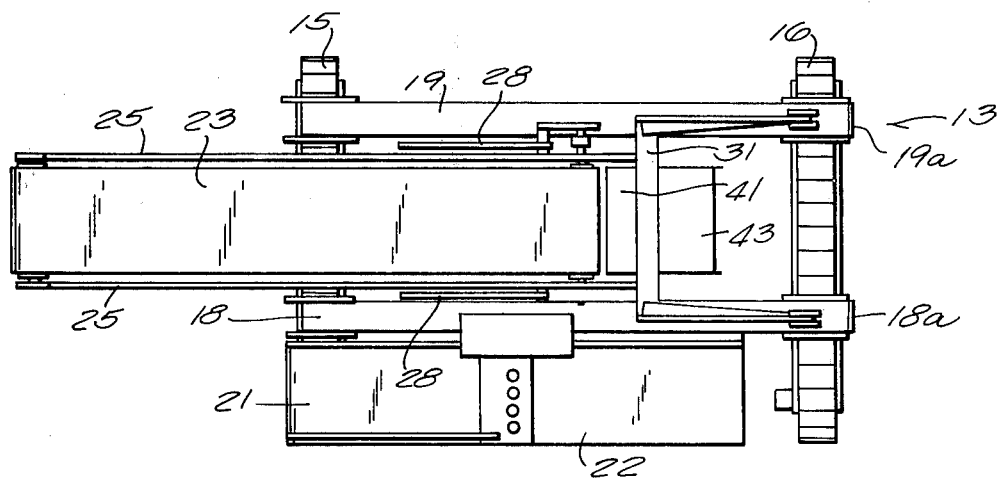

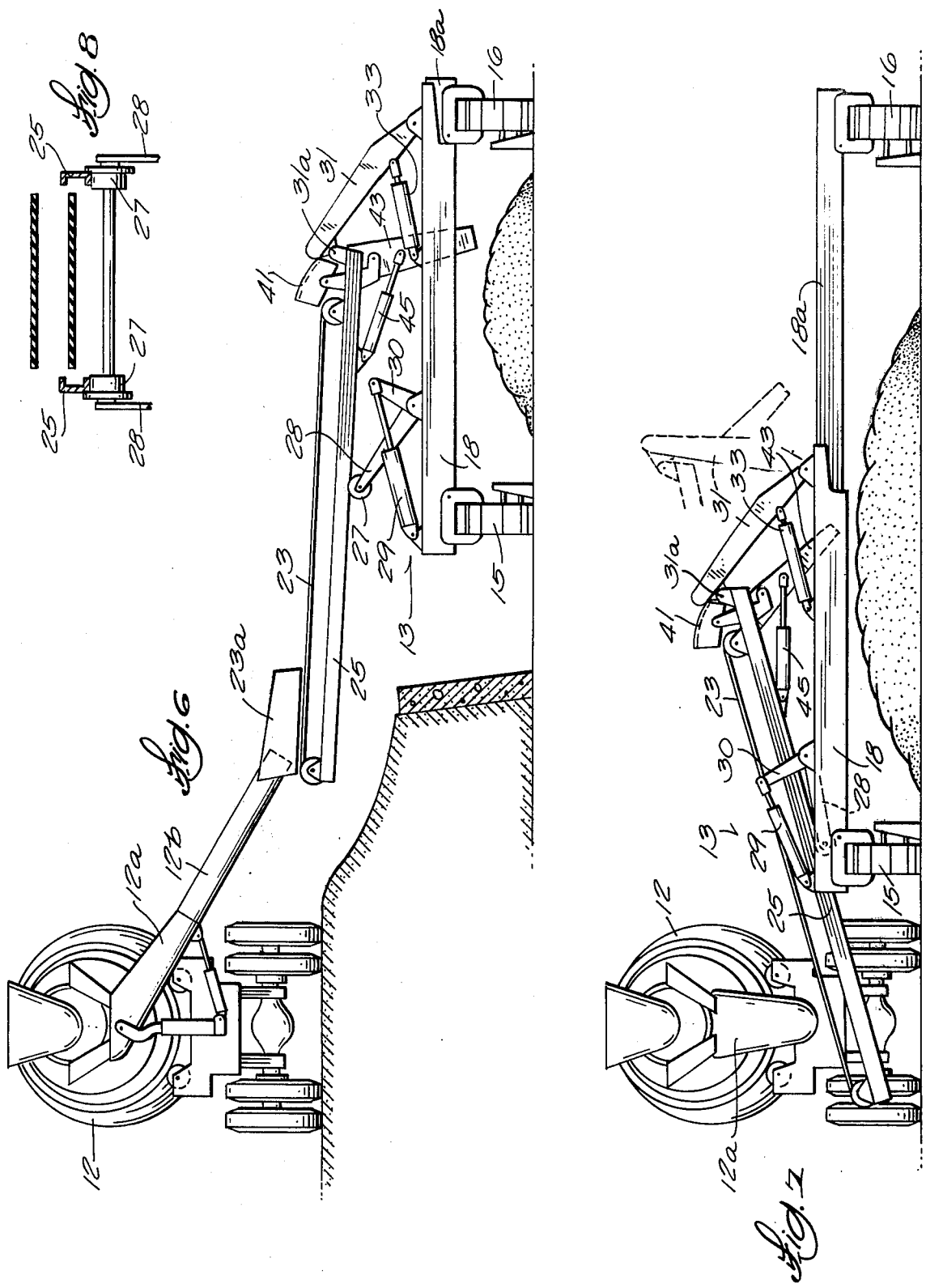

CONCRETE RECEIVER AND PLACER FOR ROAD PAVING

BACKGROUND OF THE INVENTION

In concrete roadway paving the delivering trucks may drive on the subgrade or base and deposit the freshly mixed concrete directly on the base. More generally this is not permitted or possible and the trucks must drive on the shoulder alongside the subgrade or base. A combined concrete placer and spreader is shown in my U.S. Pat. No. 3,267,824. FIG. 12 shows the machine with a projecting hopper to receiving the concrete directly from a delivery truck. The hopper may be retracted for each truck to allow it to pass the placer and spreader. As shown in my U.S. Pat. No. 3,611,890 the receiving conveyor may be a belt conveyor which is shifted laterally for that purpose. As shown in said patent, the finishing machine which follows the placer and spreader necessarily includes a secondary spreader and strike-off. In my U.S. Pat. No. 3,611,890 patent the latter machine is a slip-form paver.

The object of the present invention is to provide a versatile and relatively uncomplicated concrete placer. The machine does not include a spreader but is intended to operate immediately in front of a slip-form paver of the type shown in my U.S. Pat. No. 3,611,890 patent.

More particularly, it is an object of my invention to provide a concrete placer which can be used in paving roadways of any usual width including a double lane and also for paving alongside a finished slab or to receive the concrete from a truck which is on an adjacent but, elevated roadway.

Another object of my invention is to provide a placer having a plain, straight-run belt conveyor which can operate at high speeds.

Another object is to provide a simple and reliable mechanism which can move the conveyor endwise, that is, laterally respecting the roadway, with a well controlled acceleration and deceleration utilizing a relatively short, single operating cylinder.

Another object is to be able to raise the loading end of the conveyor where desired.

SUMMARY OF THE INVENTION

My placer includes a belt conveyor carried by an engine-powered vehicle which can span the subgrade of the roadway to be paved. The conveyor is movable laterally on two rollers and by a swinging arm to a retracted position to allow the trucks delivering the concrete and travelling on the shoulder to pass the placer. In the extended position the loading hopper of the conveyor is located immediately over the subgrade for directly receiving the concrete from the truck. The conveyor is movable also to vary the position of the discharge end of the conveyor to place the concrete at different lateral locations as may be desired. A double-sided chute at the discharge end of the conveyor provides a further range of concrete placement laterally on the subgrade.

IN THE DRAWINGS

FIG. 2 is a plan view of the placer and includes the engine and operator's station which extends from the frame of the placer.

FIGS. 3–7 are rear views of the placer and concrete delivery truck in various positions as will be more particularly described. For clarity, the engine and operator's station of the placer are not included in these views. The broken lines in FIG. 5 show the position of the conveyor and its supporting U-frame in the retracted position which allows the truck mixer on the shoulder to pass the placer.

FIG. 8 is a section taken cross-wise of the conveyor to show the wheels supporting the loading end of the conveyor of the placer.

Figure 9:
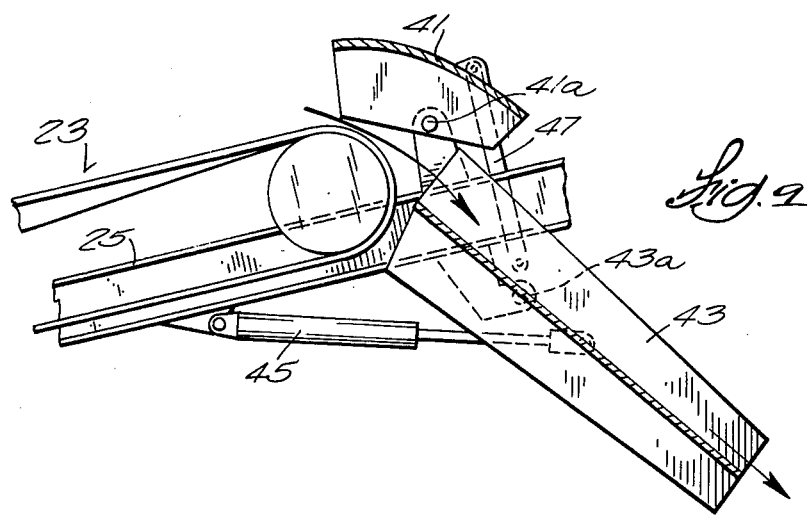
Figure 10:
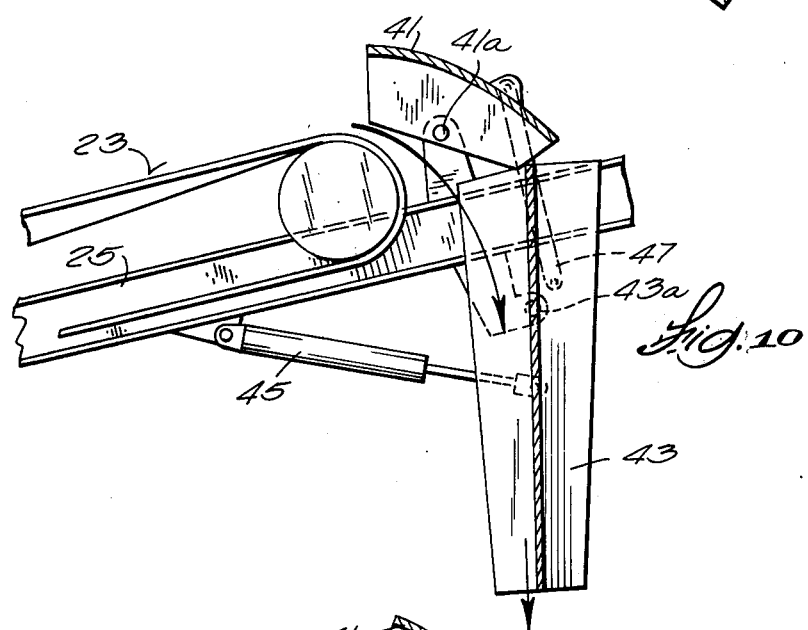
Figure 11:
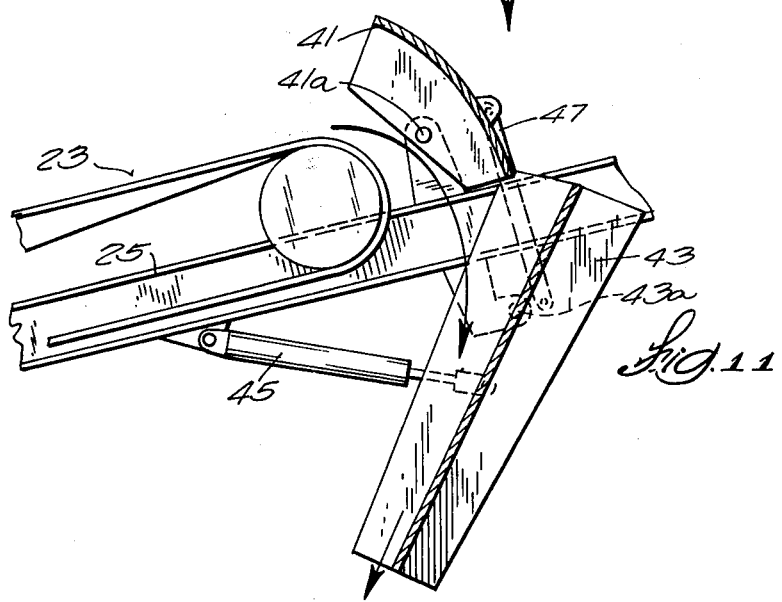

FIGS. 9–11 are enlarged views of the upper end of the conveyor showing the double-sided discharge chute of the conveyor and the discharge shield in their various positions.

DESCRIPTION OF THE PREFERRED EMBODIMENT SHOWN IN THE DRAWINGS

Figure 1:
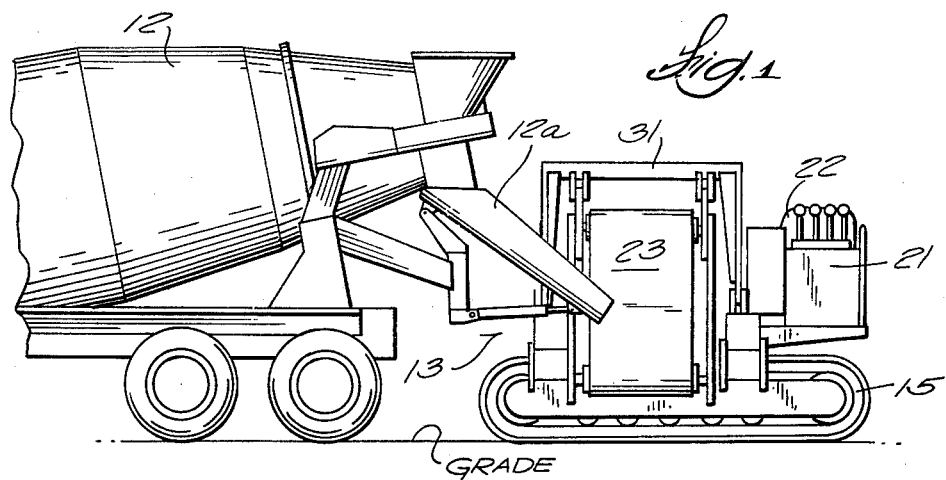
FIG. 1 shows the rear portion of a concrete delivery truck in side elevation and the loading side of the concrete placer.
Figure 3:
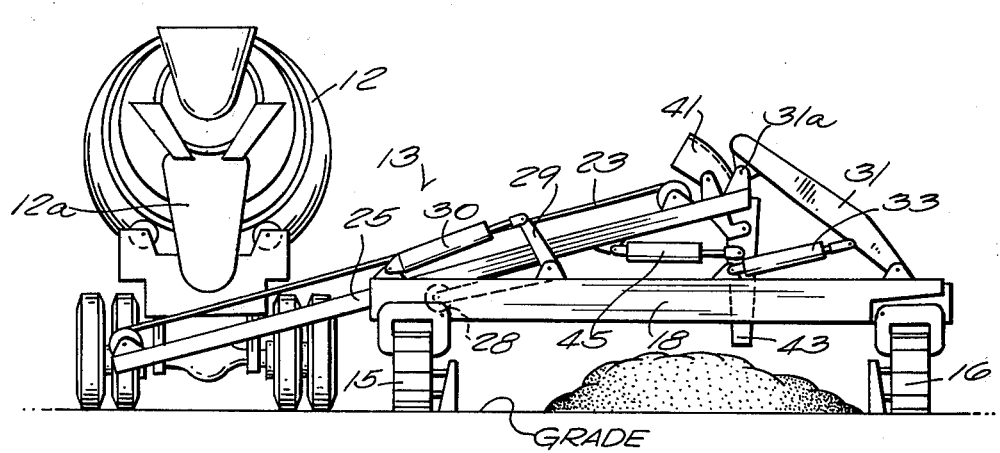

With reference to FIGS. 1 and 3, a conventional truck mixer 12 is shown on one shoulder of the grade alongside the base for the roadway to be paved and includes the usual adjustable swing spout 12a. The concrete placer 13 is self propelled and includes the crawlers 15 and 16. Crawler 15 operates on the shoulder referred to and crawler 16 operates on the other shoulder of the grade. The cross-members 18 and 19 which span the base for the roadway to be paved are supported by and join the crawlers 15 and 16 and include the extensible portions 18a and 19a respectively.

As shown in FIGS. 1 and 2, the operator's station 21 and engine 22 are cantilevered to extend from cross-member 18. The operator is able to observe the loading of the inclined conveyor 23 as well as its discharge onto the roadway base. Conveyor 23 is a conventional belt conveyor which includes a belt, head and tail pulleys, intermediate idlers (not shown) and a rigid supporting frame which includes the spaced paralled straight runners 25 and interconnecting cross braces, not shown. Runners 25 fit between cross-members 18 and 19 where the latter are joined to crawler 15 and are supported for endwise movement (cross-wise of placer 13) on the flanged wheels 27 as shown particularly in FIG. 8. The arms 28 which are pivotally carried by frame members 18 and 19 carry the wheels 27 for their vertical movement which is effected by the hydraulic cylinder 29 and crank arm 30. The lowermost position of the loading end of conveyor 23 is shown in FIG. 5. Its uppermost position is shown in FIG. 6. Its normal, intermediate position is shown in FIGS. 3, 4 and 7. The loading end of conveyor 23 is also preferably provided with a loading hopper 23a, as shown only in FIG. 6.

The upper discharge end of conveyor 23 is supported by the inverted U-frame 31. As shown in FIG. 2, the two lower ends of the legs of the inverted U-frame 31 are pivotally supported respectively by cross-members 18 and 19. The upper end of U-frame 31 is pivotally connected as at 31a to the extended runners 25 of conveyor 23. The hydraulic cylinder 33 connects cross-member 18 and one leg of U-frame and a similar cylinder connects cross-member 19 and the other leg of U-frame 13. The two cylinders operate to pivot U-frame 31 and move conveyor 23 to and between its extended and withdrawn positions. The conveyor 23 is shown in its extended position in FIGS. 1–4, 6 and 7. In FIG. 5 it is shown in a partially extended position. The broken lines in FIG. 5 show the conveyor in its retracted position which allows the truck mixer to pass by the placer.

The upper discharge end of conveyor 23 includes the shield 41 and the double-sided discharge chute 43 both of which are pivotally supported by the extended runners 25 of conveyor 23. The cylinder 45 connecting one runner 25 and the chute 43 moves chute 43 to any of various positions as desired and the link 47 connects chute 43 and shield 45 to move the latter all as will be more particularly described. FIGS. 9-11 show in enlarged detail the upper discharge end of conveyor 23 which includes the pivoted shield 41 and the double-sided discharge chute 43. The shield 41 is pivotally supported as at 41a by the extended runners 25 of conveyor 23 and the chute 43 is pivotally supported as at 43a to swing laterally of the placer. This movement is effected by the hydraulic cylinder 45 which connects one of the conveyor runners 25 and the chute. Cylinder 45 is controlled so that it can hold the discharge chute in any selected position. A link 47 connects the chute 43 and the shield 45 so that in the extended position shown in FIG. 9 the shield is tilted out of the path of the concrete as it leaves the belt of conveyor 23. The discharged concrete is thus directed and then conveyed so that it is placed on the base as in FIGS. 5 and 7.

In FIG. 10 the chute 43 is vertically positioned so that the concrete is directed against chute 43 and is placed on the base directly below the discharge end of the conveyor 23 as in FIG. 3.

In FIG. 11 the shield 41 is tilted to direct the concrete downwardly onto the chute 43 which is in a fully reversed position to extend beneath conveyor 23 and direct the concrete so that it is placed nearer to the truck mixer shown in FIG. 4.

The versatility of placer 13 is shown by the FIGS. 3 to 7. In FIG. 3 conveyor 23 is fully extended to receive concrete from truck mixer 12 which is on the shoulder at the left; the chute 43 has been in a reversed position (as in FIG. 11) and is presently in a vertical position.

In FIG. 4 the roadway being paved is along a completed slab on which truck mixer 12 is driven. The crawler 15 is or moves on the completed slab and the slight tilt of placer 13 is allowed by a corresponding adjustment of crawlers 15 and 16. Conveyor 23 is fully extended; chute 43 is fully reversed.

In FIG. 5 conveyor 23 is partially retracted and the loading end is lowered to receive concrete from truck mixer 12. The discharge end of conveyor 23 is fully elevated and chute 43 is fully extended to place the concrete on the base which is to the right of crawler 16 as shown. In this position placer 13 can deliver the concrete on the base which is to the right of crawler 16 as shown. In this position placer 13 can deliver the concrete as required where the truck mixer cannot operate directly alongside the roadway to be paved. Similarly, in FIG. 6 the roadway to be paved is below whatever sort of access road can be provided for the truck mixer. In FIG. 6 the loading end of conveyor 23 is elevated by cylinder 29 to reach the extension spout 12b of truck mixer 12.

In FIG. 7 the cross-members 18, 18a and 19, 19a have been extended to span a double roadway. The conveyor 23 and chute 43 as shown in full lines are fully extended to place the concrete midway of the road. The concrete toward the left was placed by reversing chute 43 as in FIG. 11. Other concrete will next be placed further toward the right by partially extending conveyor 23 and lowering the loading end as in FIG. 5 and fully extending the conveyor chute 43 as in FIGS. 5 and 9 and as indicated by broken lines in FIG. 7.

The placer 13 is of a rugged, relatively simple construction and the lateral movement of conveyor 23 is smoothly effected on wheels 27 by the two cylinders (33 and another) so that the conveyor can be quickly withdrawn and allow the truck mixer to move on and the next truck mixer to move into position. All of the operations described including moving the placer forward as the paving proceeds, is readily observed and controlled by the operator from the operator's position where he has also direct control of the engine which powers all of the functions of the placer as described.

For carrying wet concrete, the belt of conveyor 23 is troughed, as indicated in FIGS. 9-11. The present invention allows the conveyor to be entirely straight, so that rollers for holding the belt downward are not required.

The foregoing is a description only of the preferred embodiment of the invention as presently contemplated by the inventor. The claims which follow particularly point out and distictly claim the subject matter which is regarded as the invention.

I claim:

1. A belt placer comprising powered ground traction means, a frame having spaced cross-members connecting the tractions means, a belt conveyor extending paralled to and between said cross-members, said belt conveyor having a lower loading end and an upper discharge end, first support arms pivotally carried by the frame and pivotally connected to the discharge end of the conveyor and second support arms having support rollers supporting the loading end of the conveyor, said conveyor including two straight supporting runners which are translated on the rollers by the first support arms, and power means for moving said arms and variously positioning said conveyor.

2. The belt placer of claim 1 in which the discharge end of the conveyor includes a pivoted double-sided chute having positions for directing the concrete selectively further from the discharge end, straight downwardly, and beneath the conveyor.

3. The belt placer of claim 2 in which the first support arms are part of an inverted U-frame which is supported by the cross-members.

4. The belt placer of claim 1 in which the cross-members are extensible.

5. The belt placer of claim 1 in which the rollers supporting the loading end of the conveyor are vertically adjustable to provide the loading end of the conveyor with alternate higher, lower and intermediate positions irrespective of its lateral position.

6. A belt placer comprising powered ground traction means, a frame having spaced cross-members connecting the tractions means, a belt conveyor extending parallel to and between said cross-members, said belt conveyor having a lower loading end and an upper discharge end, first support arms pivotally carried by the frame and pivotally connected to the discharge end of the conveyor and second support arms pivotally carried by the frame and having support rollers supporting the loading end of the conveyor, said conveyor including two straight supporting runners which are translated on the rollers by the first support arms, and power means for moving said arms and variously positioning said conveyor.

7. The belt placer of claim 6 in which the discharge end of the conveyor includes a pivoted double-sided chute having positions for directing the concrete selectively further from the discharge end, straight downwardly, and beneath the conveyor.

8. The belt placer of claim 7 in which the first support arms are part of an inverted U-frame which is supported by the cross-members.

9. The belt placer of claim 6 in which the cross-members are extensible.

10. The belt placer of claim 6 in which the rollers supporting the loading end of the conveyor are vertically adjustable to provide the loading end of the conveyor with alternate higher, lower and intermediate positions irrespective of its lateral position.

11. A machine for placing on the subgrade of a roadway the concrete delivered by trucks driven on the shoulder along one side of the roadway, comprising (a) A vehicle having a powered, narrow carriage for operation on the shoulder immediate to said one side of the roadway, powered carriage means for operation along the other side of the roadway, spaced, parallel cross-members spanning the roadway and having corresponding ends connected to said carriage and their other ends connected to said other carriage means, (b) a generally inclined belt conveyor having a frame including straight lower runners extending between the said corresponding ends of said beams and a loading hopper at its lower receiving end, (c) means for supporting and laterally moving said conveyor including rollers between said cross-members and supporting the conveyor runners and a powered swing frame having upper and lower pivotal connections respectively with the discharge end of the conveyor and the other ends of the cross-members, said swing frame being disposed to move the conveyor laterally between a loading position wherein the receiving end of the conveyor is immediately over the shoulder and a retracted position wherein the receiving end is over said carriage, and, (d) a double-acting powered swing chute pivotally carried by the discharge end of the conveyor and extending downward and movable laterally with the conveyor between said cross-members for directing the discharged concrete to any selected position laterally on the roadway within a relatively wide range.

12. The belt placer of claim 11 in which the cross-members are extensible.

* * * * *